Dec. 8, 1942. V. K. ZWORYKIN 2,304,755
TELELECTROSCOPE
Filed Oct. 11, 1940

Inventor
Vladimir K. Zworykin
By
Attorney

Patented Dec. 8, 1942

2,304,755

UNITED STATES PATENT OFFICE 2,304,755

TELELECTROSCOPE

Vladimir K. Zworykin, Philadelphia, Pa., assignor to Radio Corporation of America, a corporation of Delaware Application October 11, 1940, Serial No. 360,797

14 Claims. (Cl. 178—6.8)

This invention relates to telelectroscopes and especially to an electronic telescope in which a field of several images is formed and maintained stationary by using a point or small portion of the image field to control electrically the focus or position of the remainder of the image field.

The images of stars observed through astronomical telescopes are not stationary. Movements of the images are caused by variations of the index of refraction of the column of air through which the light from the stars travels before it reaches the telescope. While the movements are less troublesome at higher altitudes, they increase with increasing diameters of the lenses or mirrors. As a rule, perfect conditions almost never exist, and, while some nights are more favorable than others, the atmospheric conditions causing these movements are often so bad as to preclude observations completely, particularly by photographic methods.

These movements due to variation of the index of refraction of the medium are so erratic that substantially instantaneous control of the telescope is required if the images are to be made stationary. Such control appears impractical, if not impossible, in a conventional astronomical telescope. It is, therefore, an object of the invention to provide means whereby image movements caused by variations of the medium through which light from the object passes to reach the observer are neutralized. Another object is to provide means for improving telectroscopes. Another object is to provide means for forming electronically an electron image of a visible object and to neutralize electrically movements of the image caused by variations in the path traveled by light from the object. An additional object is to provide means for controlling the movements of the image of a field of a plurality of objects by controlling the position of the field as a function of the image of one of said objects.

Figure 1:
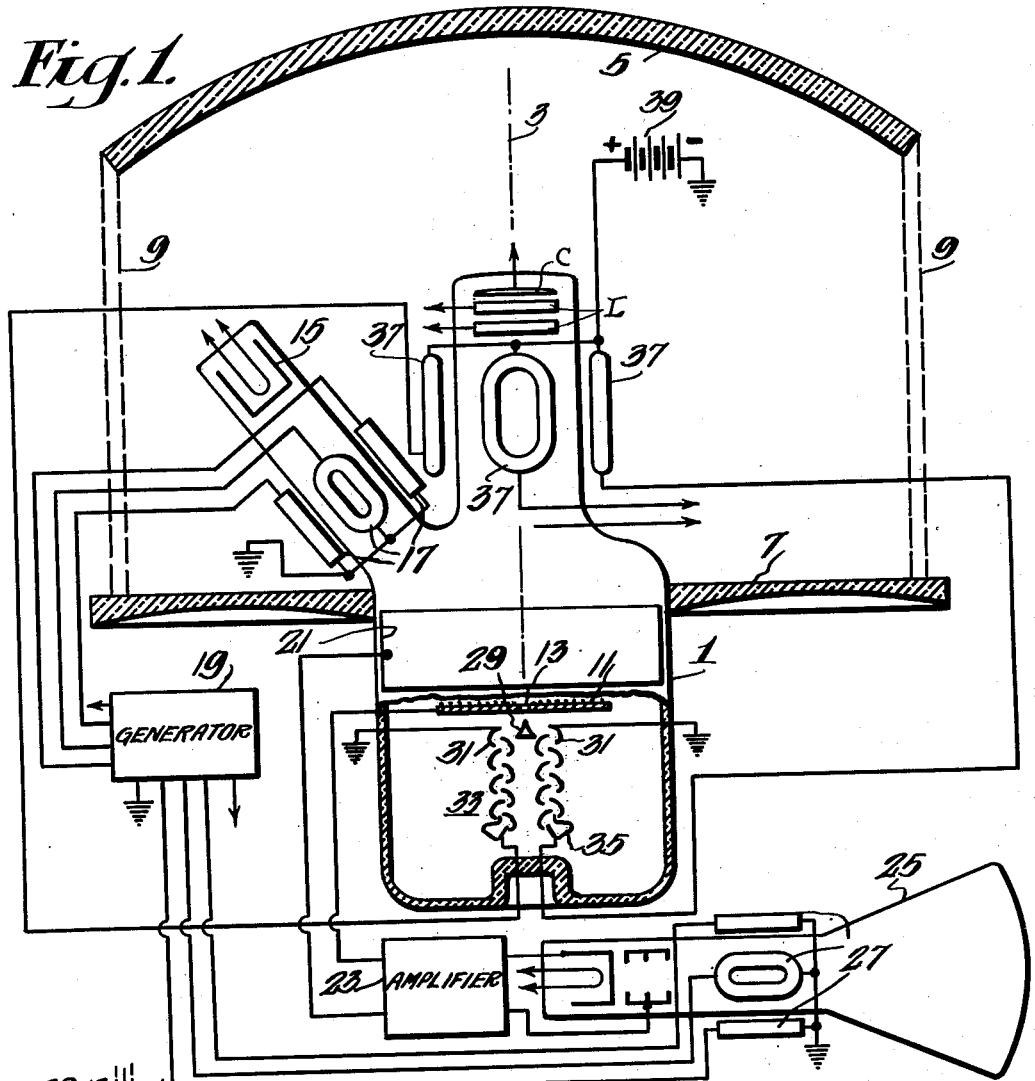
Figure 2:
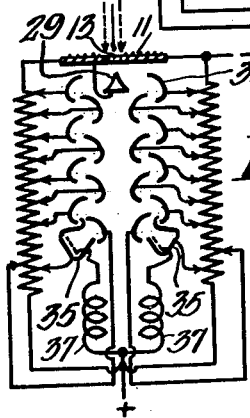
Figure 3:
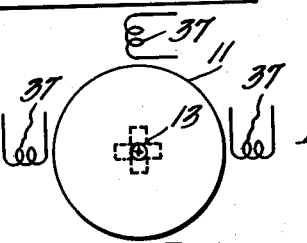

The invention will be described by referring to the accompanying drawing in which Figure 1 is a schematic diagram of one embodiment of the invention; Figure 2 is a schematic diagram of the electron multipliers used in the invention; and Figure 3 is a diagram used in describing the invention.

Referring to Fig. 1, an electronic imaging tube I of the type described in United States Patent No. 2,189,319, which was granted to G. A. Morton on February 6, 1940, is located on the longitudinal axis 3 of a conventional telescope which includes the mirror 5 and correcting lens 7. The several parts are supported by any suitable means such as the brackets 9. The imaging tube I contains in addition to the photoelectric image cathode C and electrostatic lens elements L, a mosaic screen II which includes an aperture 13. The tube also contains an electron gun 15. The gun 15 is provided with deflecting electrodes or coils 17. These electrodes or coils are connected to a source of deflecting voltage such as the generator 19. An anode 21 of the imaging tube I and the mosaic screen II are connected to the input of an amplifier 23. The output of the amplifier is applied to the control grid and cathode of a cathode ray tube 25. The cathode ray tube includes deflecting elements 27 corresponding to the deflecting means 17 of the gun 15. The deflecting electrodes 27 are also connected to the generator 19 so that the cathode ray of the tube 25 is deflected in synchronism with the electron stream from the electron gun 15, whereby the mosaic of the image tube and the fluorescent screen of the cathode ray tube may be scanned.

The device thus far described forms a telectroscope or electronic telescope. The light optical image is formed by the reflected light from the mirror striking the photosensitive image cathode C of the imaging tube and forming an electronic image which is projected on the mosaic screen II. Under bombardment of the electrons, the globules of the mosaic are charged to correspond to the light distribution of the light image. These charges are removed by the scanning beam from the electron gun 15. The thus removed charges establish electric impulses which are amplified and are applied to the control electrode of the cathode ray tube. In a manner well known to those skilled in the art, the light image is reproduced on the fluorescent screen of the cathode ray tube. The image thus formed will be subjected to the movements of the original light image previously described.

The neutralization of these movements is affected by the following means: An initial target, forming an electron emissive or deflecting member 29, is located on the longitudinal axis of the imaging tube I immediately below the aperture 13. The deflecting target member may be a conical with plane, concave or convex surfaces, or may be of pyramidal form with four plane or curved sides. The four electron-emissive surfaces 31 of four electron multipliers 33 are located (preferably symmetrically) about the longitudinal axis 3 of the imaging tube. The output electrodes 35 of these tubes are connected respectively to four deflecting coils 37 which are located about the longitudinal axis 3 to correspond to the arrangement of the electrodes 31. While the deflecting coil arrangement has been described as four coils, in practice each of the coils is preferably divided in oppositely located halves to provide a symmetrical deflecting system. The remaining terminals of the several coils are connected together and are connected to the positive terminal of the battery 39 which biases the several electrodes of the electron multipliers 33. The details of the multipliers and the connections thereof, partly shown in Fig. 2, are fully shown in United States Patent No. 2,125,750, which was granted on August 2, 1938 to E. G. Ramberg.

In the operation of the device an image of one of the distant objects of the field to be viewed is centered on the apex of the deflecting member 29. The centering may be ascertained by measuring the outputs of the electron multipliers. If the several output currents are equal, the deflecting coils 37 will exert equal and opposite forces on the electrons passing to the mosaic screen. Therefore, no movement will result. If, however, the electrons passing through the aperture should start to move away from the longitudinal axis because of apparent motion of the distant reference object, one of the electron multipliers will receive more electrons and its output will increase, thus increasing the current in the corresponding deflecting coil, which will instantaneously neutralize the attempted movement. Since most of the objects within the field are subject to substantially the same variations of the index of refraction of the medium, it follows that the neutralization of the attempted movement of the reference image will neutralize movements of the remainder of the image.

While the aperture (through which the electrons representing the reference image) has been shown as centrally located in the mosaic screen, it should be understood that the aperture, deflecting member, and electron multipliers may be located on the edge of the image field. In fact, it is preferable to locate the aperture at the edge of the field so that the entire image tube may be rotated to select any reference image on the circumference of the field, thus leaving the remainder of the field for the desired image.

Thus the invention has been described as a telectroscope in which a portion of the image is directed on a target, which uniformly applies electrons to electron multipliers. If the electron multiplier output is uniform, no correcting force is applied to the initial and entire electronic image. If the reference image attempts to move with respect to the target, forces derived from the multipliers neutralize or counteract the attempted movement. Thus, movements of the entire image are prevented by using a very small portion of the image as a reference source. While the invention has been described as including a television system for forming on optical image, it should be understood that the image tube may include a fluorescent screen which is substituted for the mosaic screen to form the optical image. In either arrangement, the method of neutralizing movements of the image may be applied. While the method has been described with reference to astronomical observations, and especially with respect to movements caused by variations in the index of refraction of the light-transmitting medium, it should be understood that it will also correct image movements caused by imperfections in the conventional guiding mechanism of a telescope.

I claim as my invention:

1. A telelectroscope including means for forming an electron image corresponding to a plurality of distant objects, a target, means for directing a reference portion of said image on said target, means responsive to movements of the image directed on said target to establish inertialess forces corresponding to said movements, means for deflecting said electron image, and inertialess means for applying said forces to said deflecting means to neutralize said movements whereby the remainder of said image is maintained substantially stationary as a function of said reference portion.

2. A telelectroscope of the type described in claim 1 including means for scanning said remainder image to derive electric impulses, and means including said impulses for forming an optical image corresponding to said remainder image.

3. A telelectroscope including means for forming an electron image corresponding to a plurality of objects to be viewed through a medium having a variable index of refraction, a target, means for directing a portion of said image on said target, means responsive to movements of the image directed on said target for establishing electrical forces corresponding to said movements, means for deflecting electrically the said electron image, and means for applying said electrical forces to said deflecting means to counteract movements of said electron image due to said variable index of refraction.

4. A telelectroscope including means for forming an electron image corresponding to a distant field to be viewed, a mosaic screen including an aperture, a target located behind said aperture, means for directing said electron image on said screen including a reference portion thereof on said target, means responsive to undesired movements of the electrons striking said target for establishing forces corresponding to said undesired movements, means for deflecting the electron image, means for applying said forces to said deflecting means to neutralize said movements and for counteracting movements of said electron image as a function of the reference portion thereof, and means for converting the electron image applied to said mosaic screen into a light optical image.

5. A telelectroscope including means for forming an electron image of a plurality of distant objects, a fluorescent screen, means for applying said electron image to said screen, an electron-emissive target, means for directing a portion of said electron image onto said target, a plurality of electron multipliers responsive to undesired movements of the electron image directed onto said target for establishing forces corresponding to said undesired movements, means for deflecting said electron image with respect to said fluorescent screen, and means for applying said forces to said deflecting means to neutralize movements of said electron image.

6. A telelectroscope including means for forming an electron image corresponding to a distant field to be viewed, a mosaic screen including an aperture, an electron-emissive target located behind said aperture, means for directing said electron image on said screen including a reference portion thereof on said target, means responsive to undesired movements of the electrons striking said target for establishing electrical forces corresponding to said undesired movements, means for deflecting the electron image, means for applying said electrical forces to said deflecting means to neutralize said movements and for counteracting movements of said electron image as a function of the reference portion thereof, and means for converting the electron image applied to said mosaic screen into a light optical image.

7. A telelectroscope including means for forming an electron image of a plurality of distant objects, said image being subject to undesired movements, a fluorescent screen, means for focusing said electron image to said screen, an electron-emissive target, means for directing a portion of said electron image onto said target, a plurality of electron multipliers responsible to undesired movements of the electron image directed onto said target for establishing electrical forces corresponding to said undesired movements, means for deflecting said electron image with respect to said fluorescent screen, and means for applying said electrical forces to said deflecting means to neutralize movements of said electron image.

8. In combination, means for producing an electron image corresponding to an optical image in an area spaced from said optical image, means responsive to undesired movement of said electron image for deriving from the electrons constituting a portion of said electron image a force corresponding to the movement of said electron image in said area, and means for subjecting said electron image to said force whereby to counteract said undesired movement of said electron image in said area.

9. In combination, a photosensitive image cathode, means for applying an optical image subject to undesired movement to said image cathode to convert said optical image into an electron image corresponding to said optical image, a screen electrode, means comprising the elements of an electron lens system intermediate said said image cathode and said screen and through which said electron image passes to said screen, means adjacent said screen and responsive to undesired movement of the electrons constituting a reference portion of said electron image for generating an electrical force corresponding to said undesired movement, and means for applying said electrical force to said electron lens system to compensate for said undesired movement of said electron image.

10. A telelectroscope including in combination means for forming a light optical image, said light optical image being subject to undesirable movements, means for converting said optical image into an electronic image, means responsive to a reference portion of said electronic image for deriving forces corresponding to said movements, and inertialess means for applying said forces to prevent undesired movements of the electrons forming said image.

11. The method of preventing undesired movements of a light optical image which includes converting said optical image into an electronic image, selecting a reference portion of said electronic image, deriving inertialess forces from undesired movements of said reference portion, and applying said forces to prevent undesired movements of said electronic image.

12. The method of preventing undesired movements of a light optical image which includes converting said optical image into an electronic image, selecting a reference portion of said electronic image, deriving inertialess forces from undesired movements of said reference portion, applying said forces to prevent undesired movements of said electronic image, deriving electric impulses corresponding to said electronic image, and converting said electric impulses into a visible image corresponding to said light optical image.

13. The method of preventing undesired movements of a light optical image which includes converting said optical image into an electronic image, selecting a reference portion of said electronic image, deriving inertialess forces from undesired movements of said reference portion, applying said forces to prevent undesired movements of said electronic image, and converting said electronic image into a light optical image corresponding to said first-mentioned light optical image.

14. The method of preventing undesired movements of a light optical image which includes converting said optical image into an electronic image, selecting a reference portion of said electronic image, deriving inertialess forces from undesired movements of said reference portion, applying said forces to prevent undesired movements of said electronic image, deriving electric impulses corresponding to said electronic image, amplifying said electric impulses, and converting said amplified electric impulses into a visible image corresponding to said light optical image.

VLADIMIR K. ZWORYKIN.